United States Patent [19]

Shinoda et al.

[11] Patent Number: 4,567,506

[45] Date of Patent: Jan. 28, 1986

[54] MONITORING APPARATUS FOR COLOR PRINTING

[75] Inventors: Morimasa Shinoda; Takamasa Takahashi, both of Tokyo, Japan

[73] Assignees: Nippon Univac Supply Kaisha, Ltd.; Limited Company of Shinoda Sekkei Jimusho, both of Tokyo, Japan

[21] Appl. No.: 598,790

[22] Filed: Apr. 10, 1984

[30] Foreign Application Priority Data

Apr. 28, 1983 [JP] Japan ................... 58-74088

[51] Int. Cl.$^4$ .................. H04N 7/18; H04N 11/04
[52] U.S. Cl. .................... 358/11; 358/13; 358/101; 358/106; 358/140
[58] Field of Search .......... 358/93, 101, 106, 138, 358/140, 11, 13, 21 R, 22; 360/22

[56] References Cited

U.S. PATENT DOCUMENTS

| | | | |
|---|---|---|---|
| 2,486,334 | 10/1949 | Slamar | 358/101 |
| 2,648,723 | 8/1953 | Goldsmith | 358/101 |
| 3,958,509 | 5/1976 | Murray | 358/101 |
| 4,146,907 | 3/1979 | Jensen | 358/101 |
| 4,463,373 | 7/1984 | Mikami | 358/106 |
| 4,500,908 | 2/1985 | Mandeberg | 358/11 |
| 4,518,984 | 5/1985 | Mitschke | 358/22 |
| 4,524,379 | 6/1985 | Okada | 358/11 |
| 4,531,153 | 7/1985 | Watanabe | 358/13 |

*Primary Examiner*—Howard W. Britton
*Attorney, Agent, or Firm*—Wenderoth, Lind & Ponack

[57] ABSTRACT

A monitoring apparatus for color printing enables printed matter which is moving at a high speed to be displayed as a stationary image on a color television monitor. The apparatus includes a stroboscope for illuminating the moving printed matter, a color television camera for receiving images which are reflected from or transmitted through the moving printed matter, a first conversion circuit which is connected to an IC memory to convert and store the received images, and a second conversion circuit connected to a color television monitor for displaying the received images which have been stored in the IC memory.

1 Claim, 12 Drawing Figures

MONITORING APPARATUS FOR COLOR PRINTING

BACKGROUND OF THE INVENTION

The apparatus of the present invention is composed of a stroboscope, a color television camera, an IC memory, a color television monitor and the like. The apparatus is principally designed to display, on a color television monitor, a dragonfly mark, deviations in a print, contamination in a print, a dot, etc., as a stationary image, during the operation of a multi-color printing offset printer, so that an operator may monitor them.

Conventional methods for monitoring the dragonfly mark, the deviations in a print, the contamination in a print, the dot, etc. during multi-color printing include a method in which strobe light is synchronously emitted so as to illuminate the printed matter so that the operator may directly monitor its condition using his eyes, and a method in which a polygonal mirror is synchronously rotated towards the printed matter.

However, the former method has the following disadvantages:

(1) An excessive flicker (particularly at a low speed), thus failing to achieve accurate monitoring.

(2) Due to the flicker, the operator becomes severely fatigued.

(3) Unavoidable stray light influences occur because of the nature of the working environment, thereby causing a monitor image which is not completely stationary.

(4) The effective field of vision is excessively narrow.

The latter method has the following disadvantages:

(1) Since the apparatus is mechanical, the apparatus is large in size, and a considerable modification of the printer itself is necessary.

(2) The change in flow size of the printed matter cannot be made simple.

(3) The field of vision is narrow because of the nature of the configuration.

(4) Since there is inherent flicker, there poses a problem with respect to continuous monitoring.

(5) Since the monitoring position is limited, it is difficult to interlock with the operating sections of the printing machine.

(6) The apparatus cannot be moved to other printing machines.

SUMMARY OF THE INVENTION

It is therefore an object of the present invention to provide a monitoring apparatus for color printing in which printed matter moving at a high speed is permitted to be displayed as a stationary image on a color television monitor so that monitoring may be accomplished easily.

The present invention provides an apparatus comprising: a stroboscope for illuminating printed matter moving at a high speed with an extremely short pulse-like strobe light, a color television camera for receiving an image formed by light reflected from or transmitted through said printed matter, said light being from said stroboscope, an A/D conversion circuit for converting a composite video signal resulting from a lag of a projected image formed on a camera tube of said color television camera, a serial to parallel conversion circuit for converting a serial digital output signal into a parallel digital signal, an IC memory for storing the first vertical synchronizing signal of a first field and a second field of said composite video signal, an address control circuit for said IC memory for repeatedly delivering video signals for one field portion stored in said IC memory in the order of: one—a vertical synchronizing signal of the first field, two—a video signal of the first field, three—a vertical synchronizing signal of the second field, and four—a video signal of the first field, and a color television monitor for displaying a read-out signal from said IC memory as a stationary image of said printed matter through a parallel to serial conversion circuit and a D/A conversion circuit. The embodiment of the invention will now be described with reference to the accompanying drawings.

DESCRIPTION OF THE PREFERRED EMBODIMENT

Figure 1:
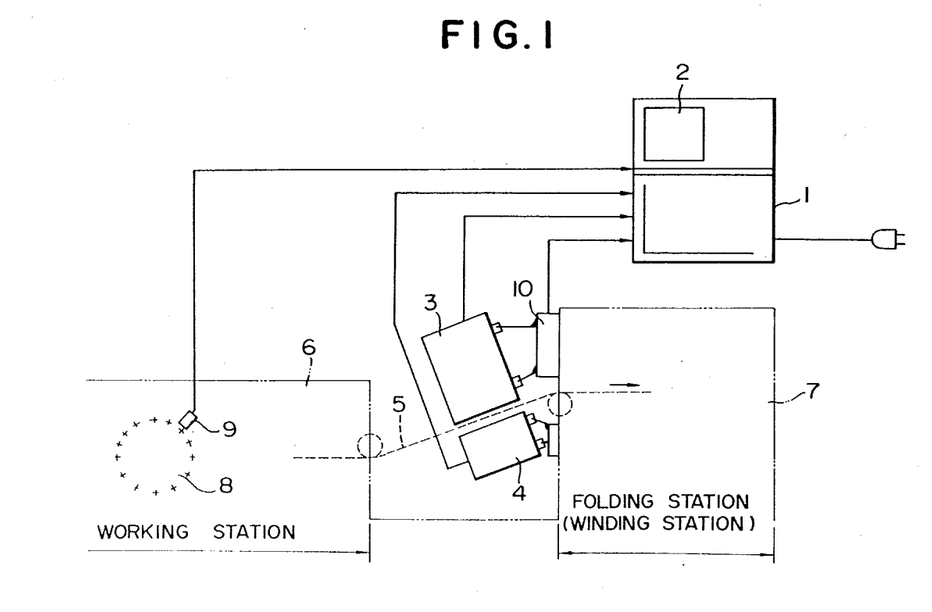
FIG. 1 is a side view showing an arrangement of various instruments and devices.

FIG. 1 shows an arrangement of various instruments of the apparatus in accordance with the present invention. The apparatus comprises a body 1 provided with a color television unit 2, a surface stroboscope and color television camera unit 3, a rear stroboscope unit 4 which is provided in a position which is opposite to the unit 3, a print paper 5 wound on a winding or folding station 7 and passing between the units 3 and 4 via a working station 6, a marginal gear 8, a proximity sensor 9 which is provided in a position which is opposite to the marginal gear 8, and a laterally moving mechanism 10 for moving the unit 3 by means of a pulse motor (not shown).

Figure 2:
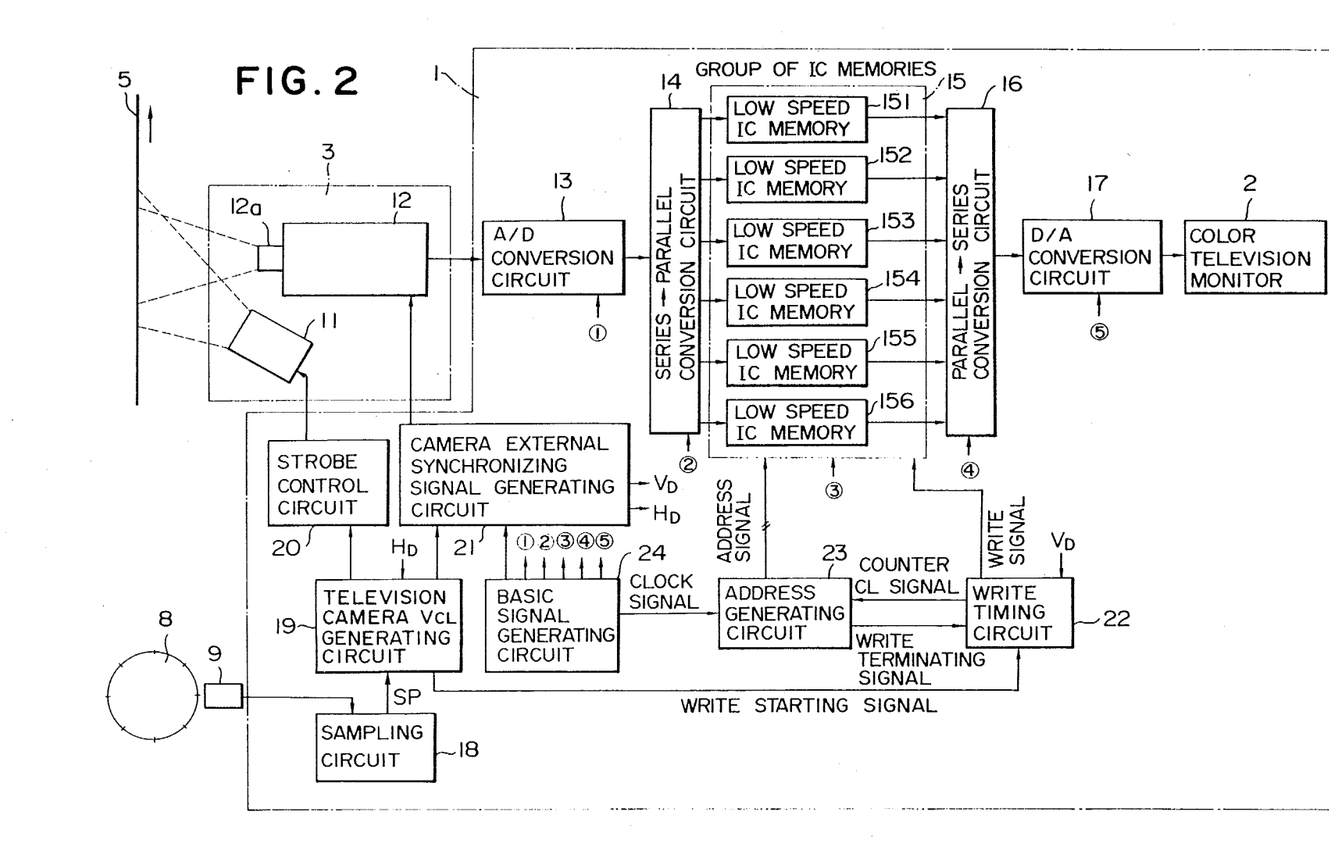
FIG. 2 is a block diagram of a main electrical circuit.

FIG. 2 is a block diagram of an electrical circuit. A reference numeral 11 designates a stroboscope provided within the unit 3, and a reference numeral 12 denotes a color television camera.

The stroboscope 11 emits strobe light in synchronism with the rotation of the marginal gear 8, and information related to the print paper 5 on which the strobe light irradiates is formed on a camera tube (generally, a vidicon or saticon) having a lag characteristic through a zoom lens 12a of the color television camera 12 within the unit 3.

Figure 3:
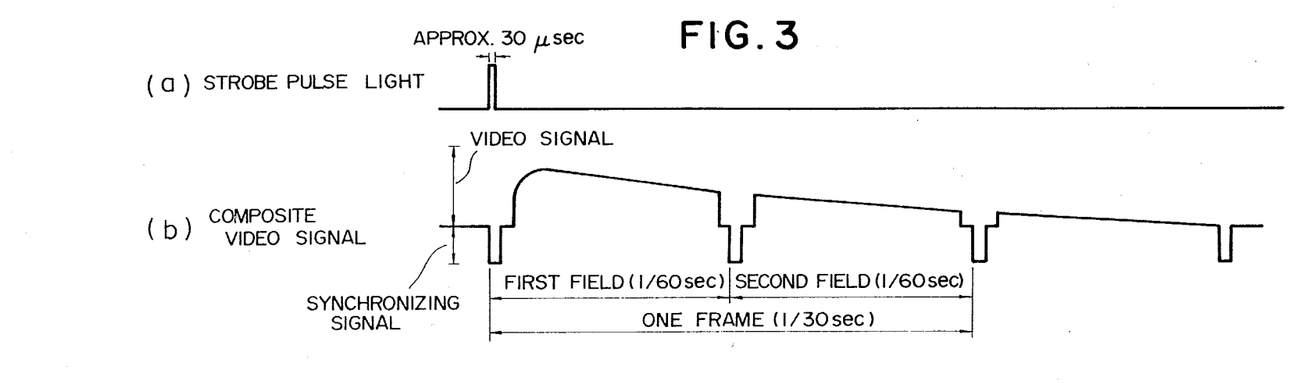
FIG. 3 is a view showing a lag characteristic of a camera composite video signal.

The lag characteristic is as shown in FIG. 3 (b), when a pulse of strobe light of approximately 30 μsec as shown in FIG. 3 (a) irradiates the paper. The change in video signal due to the lag characterisitic takes a little time to rise at the outset and attenuates substantially exponentially after it has reached a peak.

That is, as time passes, a level of brightness reduces and at the same time, a color signal itself also reduces and an out-of-focus phenomenon which occurs due to diffusion also increases.

However, the video signal of the first field can be maintained at a useable level by controlling the brightness and pulse width of the strobe light.

The present invention makes use of the video signal of the first field.

Figure 4:
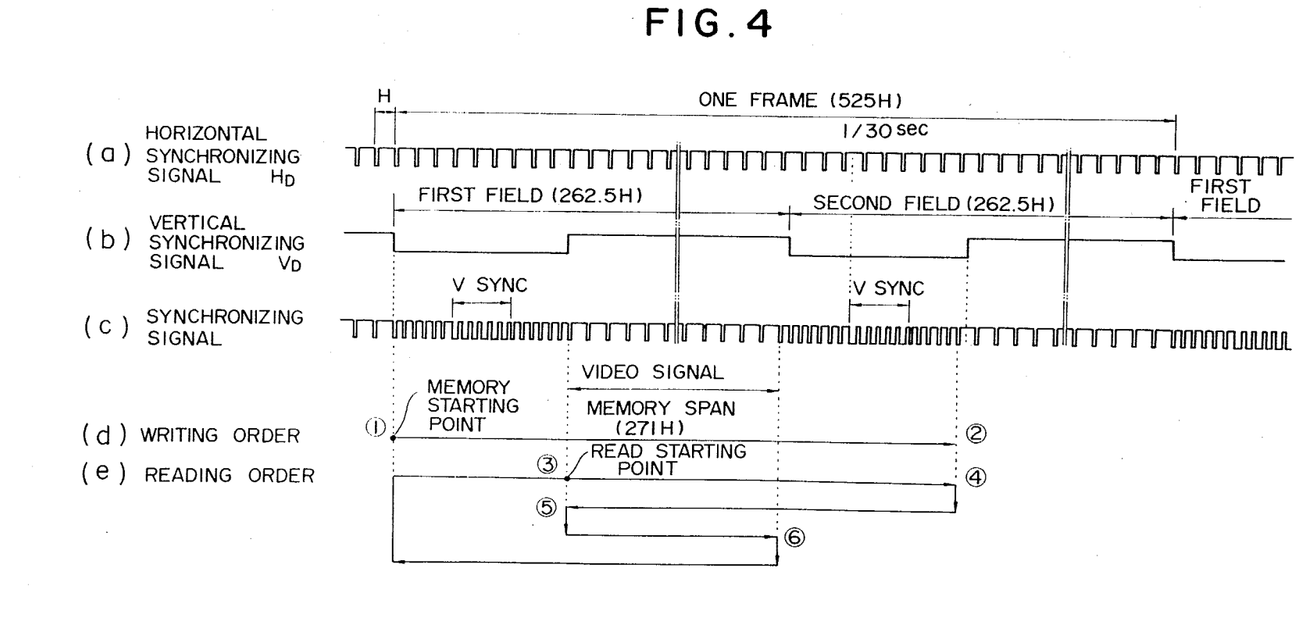
FIG. 4 is a time chart of synchronizing signals in an NTSC system.

On the other hand, the color television camera and color television monitor currently generally used employs an NTSC system which decreases flicker and enhances the image quality by means of the so-called jump scanning in which in the first field (1/60 sec), one frame is roughly scanned, and in the second field, an intermediate portion of the first field is restored, as shown in FIG. 4.

Particularly in case of a color image, unless the NTSC system is employed, the image quality is excessively deteriorated, which is not practical.

However, where a strobe light is used, when one frame is stored in a memory without modification and is then re-televised on the color television monitor, the bright and dark images are alternately displayed thereon because of the presence of a difference in brightness between the first and second fields, thus causing a flicker to occur, which is also not practical.

In the present invention, the video signal of the first field is also used in the second field to overcome the aforesaid disadvantage. That is, as shown in FIG. 4, when the vertical synchronizing signal of the first field, the video signal of the first field and the vertical synchronizing signal of the second field are stored in the memory and read out, the read-out cycle is in the order of: one—the vertical synchronizing signal of the first field, two—the video signal of the first field, three—the vertical synchronizing signal of the second field, four—the video-signal of the first field and the cycle is accomplished by changing the address of the memory to make the jump scanning possible. If a black and white television camera is used, when image receiving signals are stored in the memory, a sampling speed of approximately 250-300 nsec will suffice and therefore, a relatively inexpensive memory can be used. However, where composite color video signals are stored in the memory, a sampling speed of approximately 70 nsec is required.

Also, in the case of a color camera, a memory capacity which is about four times of that of the black and white television camera is required.

On the other hand, a memory whose cycle time is 70 nsec is very expensive, which is not practical.

For these reasons, color printing monitoring apparatus have not been used.

Under these circumstances, in the present invention, a system is employed wherein as shown in FIG. 2, a composite color video signal A/D conversion circuit 13 is provided to convert the analog color video signal into a serial digital signal, after which the serial digital signal is converted into a parallel digital signal by a serial to parallel conversion circuit 14 so as to enable it to be stored in low speed IC memories 151-156 whereby inexpensive low speed IC memories can be used.

In accordance with the above-described system, if for example, a 6-stage shift is made by the serial to parallel conversion circuit 14, and thereafter, signals are stored in the low-speed memories 151-156, a low speed IC memory whose cycle time is approximately $70 \times 6 = 420$ nsec can be used. The IC memory of this kind is very inexpensive and therefore can be put to practical use.

It is obvious that to form a display on the color television monitor 2, the output signal of said IC memory 15 must be returned to its original form by the parallel to serial conversion circuit 16, and a composite color video signal is regenerated as an analog signal by D/A conversion circuit 17.

As can be understood from the foregoing description, the present invention has the following advantages:

(1) Since a pulse-like strobe light is used, a nearly complete stationary image can be obtained. Any object moving at a high speed can be monitored, in principle, as a stationary image.

(2) Since all the signals are processed as electrical signals, there is about no limit with respect to the apparatus mounting position or the like. Instruments and devices can be connected by electrical wiring. Only the monitor television which performs monitoring can be installed on the operating section of the printer, and a plurality of color television monitor sets can be installed.

(3) Since inexpensive low speed IC memories can be used, practicability is extremely high.

(4) Since in image regeneration, complete jump scanning takes place, the image quality can be made exactly equal in level to that of an ordinary television image.

(5) Since the change of printed matter due to a change in size or the like can be made by merely changing the logic of the electric signal, such a change can be done very simply.

(6) Since enlargement and reduction in the monitoring of the printing condition can be accomplished simply by changing lenses, dots or the like, for example, can be satisfactorily monitored as a stationary image.

(7) Since a video signal is stored in the IC memory, a connection to a computer or the like can be made, and also, the application of the present invention to a completely automatic monitoring apparatus using a pattern recognition of an object moving at a high speed can be made.

Figure 5:
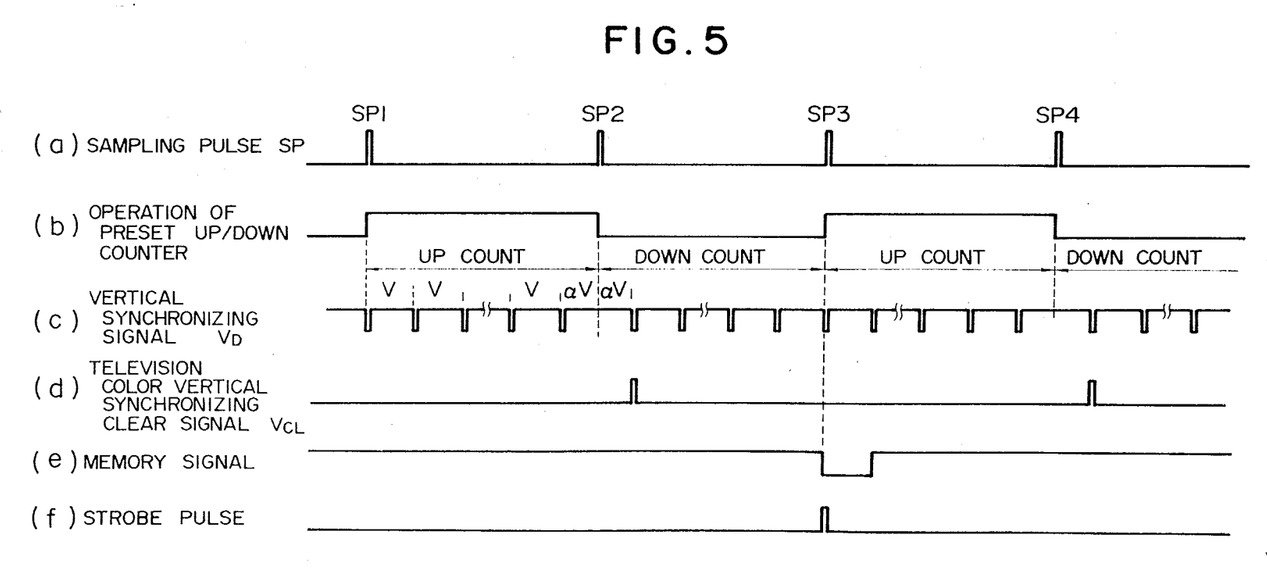
FIG. 5 is a view showing the principle in which a sampling pulse is periodically adjusted to a camera vertical synchronizing signal.

In the present invention, the first vertical synchronizing signal of a first field and a second field of a composite video signal is stored in the IC memory 15, and a sampling pulse SP (in the embodiment, at a pulse rate of one pulse per second) fed from a sampling pulse generating circuit 18 and a camera vertical synchronizing signal are required to be adjusted periodically. However, in the apparatus of the embodiment, adjustment of synchronization is carried out in accordance with the principle as shown in FIG. 5.

That is, the adjustment of synchronization is carried out in such a manner that, in view of the fact that the width of the first frame of the composite video signal is 525 portions of the horizontal synchronizing signal, when 525 horizontal synchronizing signals are counted, a preset up/down counter which is to be reset is used to input the first sampling pulse SP1 and then the up count starts. When the second sampling pulse SP2 is input, the mode of counting is switched to count down, and when the count value is equal to 0, a clear signal $V_{CL}$ for clearing the television camera vertical synchronizing signal is outputted for the adjustment of the synchronization.

Figure 6:
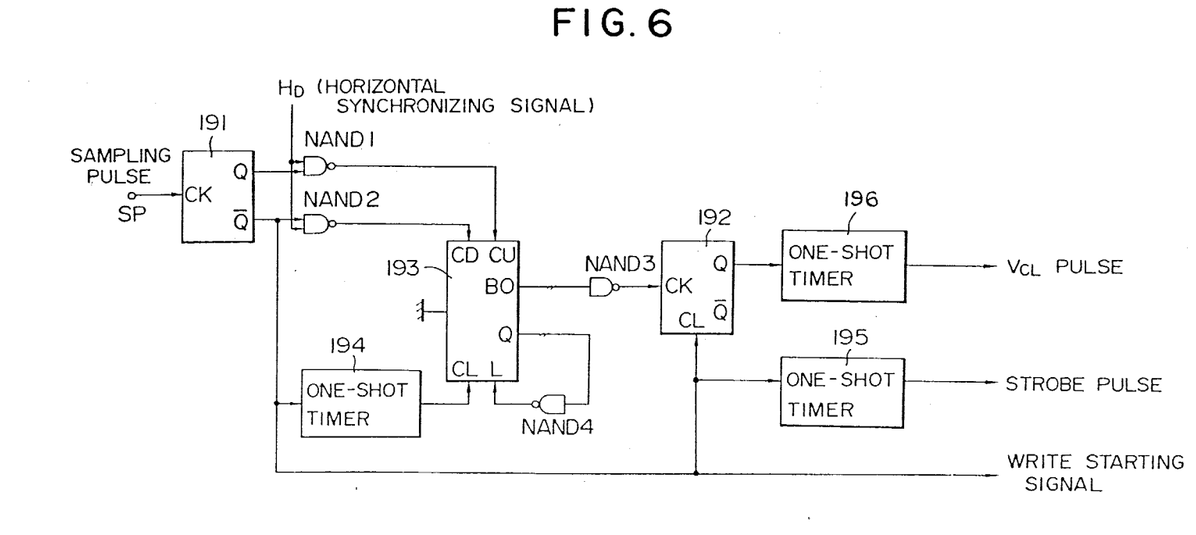
FIG. 6 is a block diagram of a television camera $V_{CL}$ generating circuit.
Figure 7:
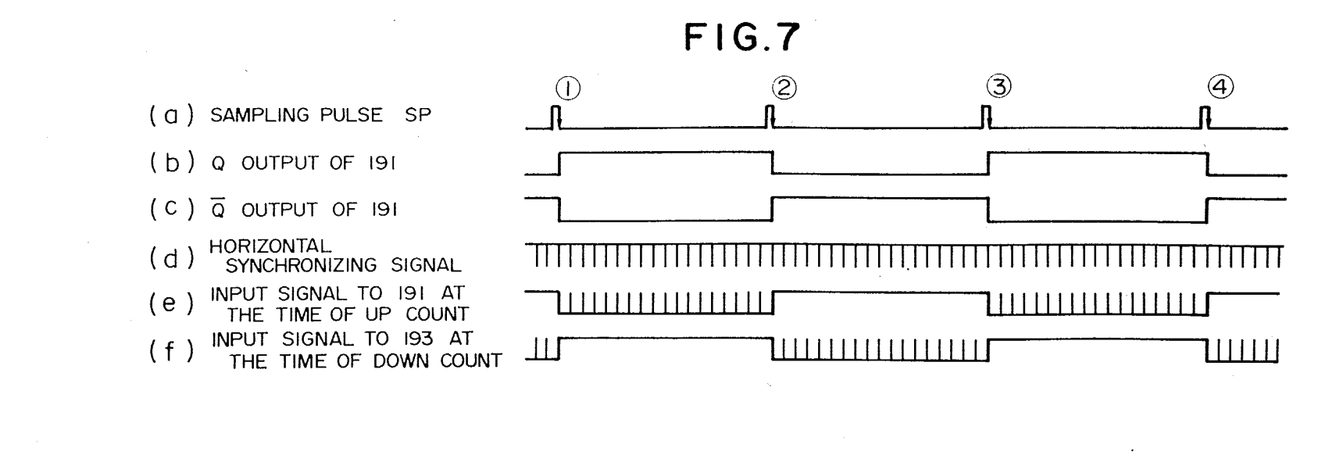
FIG. 7 is a time chart of output signals in various sections.

FIG. 6 shows the details of a television camera $V_{CL}$ generating circuit 19 in which said adjustment of the synchronization is executed and in which the $V_{CL}$ pulse and a strobe pulse and a write start signal are delivered. Reference numerals 191 and 192 denote J/K flip-flops; element 193 is a preset up/down counter; elements 194–196 are one-shot timers, and elements NAND1 - NAND4 are NAND gates.

When, in the sampling circuit 18, the first sampling pulse SP is input into the J/K flip-flop 191, its Q output becomes an "H" level and its $\overline{Q}$ output becomes an "L" level, and a horizontal synchronizing signal $H_D$ is input, for counting, into the counter 193 through the NAND gate NAND 1.

When the counter 193 counts up to the number corresponding to the width ($525 \times H_D$) of one frame of the composite video signal, its Q output becomes an "H" level, and all the stages of the counter 193 are set to an "L" level by NAND gate NAND4, and therefore, the counter 193 is reset, after which counting again starts.

Such an operation is repeatedly effected, and when the subsequent sampling pulse SP2 is input into the J/K flip-flop 191, its $\overline{Q}$ output becomes an "H" level and its Q output becomes an "L" level. The NAND element NAND 2 is then enabled whereby the vertical synchronizing signal $H_D$ is input into the down input of the counter, and the counter 193 subtracts counts from the stored count which is present when the count-up operation is effected.

When the count in the counter is equal to 0, the output of the NAND gate NAND 3 which is connected to the BO terminal (bolo output = counter O confirmation output) is changed from an "H" level to an "L" level.

At this time, the $\overline{Q}$ output of the J/K flip-flop 191 is an "H" level, and therefore, the CL terminal of the J/K flip-flop 192 is also at an "H" level. Thus, the Q output of the J/K flip-flop 192 is changed from an "L" level to an "H" level.

Accordingly, a pulse $V_{CL}$ (a pulse for resetting a vertical synchronizing signal of the television camera) is delivered from the one-shot timer 196 which is connected to the Q output terminal of the J/K flip-flop 192.

On the other hand, a strobe pulse is output from the one-shot timer 195 which is connected to the $\overline{Q}$ terminal of the J/K flip-flop 191, at the moment that the $\overline{Q}$ terminal of flip-flop 191 is changed from an "H" level to an "L" level.

This strobe pulse is applied to the strobe control circuit 20 to light the strobe light contained within the stroboscope 11.

The one-shot timer 194 is provided whereby the counter 193 is positively made to assume a reset condition by the odd numbered sampling pulse.

Figure 8:
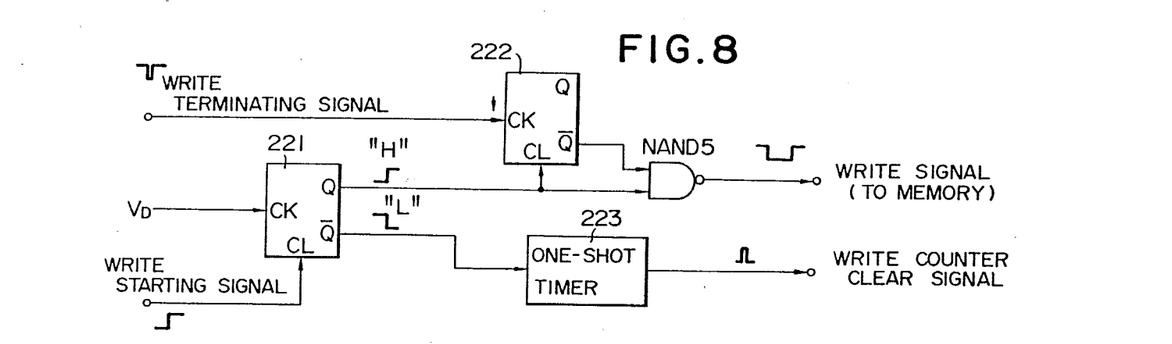
FIG. 8 is a block diagram of a write timing circuit.

Next, a write timing circuit 22 will be described.

This circuit comprises a signal generating circuit in which a vertical synchronizing signal $V_D$ is made to synchronize with a write starting signal which is synchronized with the sampling pulse SP, and a write signal which is synchronized with a write terminating signal is also generated to positively provide a write span of the memory 15.

FIG. 8 is a block diagram showing the details of said circuit 22. Reference numerals 221 and 222 each designate a J/K flip-flop, and NAND 5 is a NAND gate, and element 223 is a one-shot timer.

Figure 9:
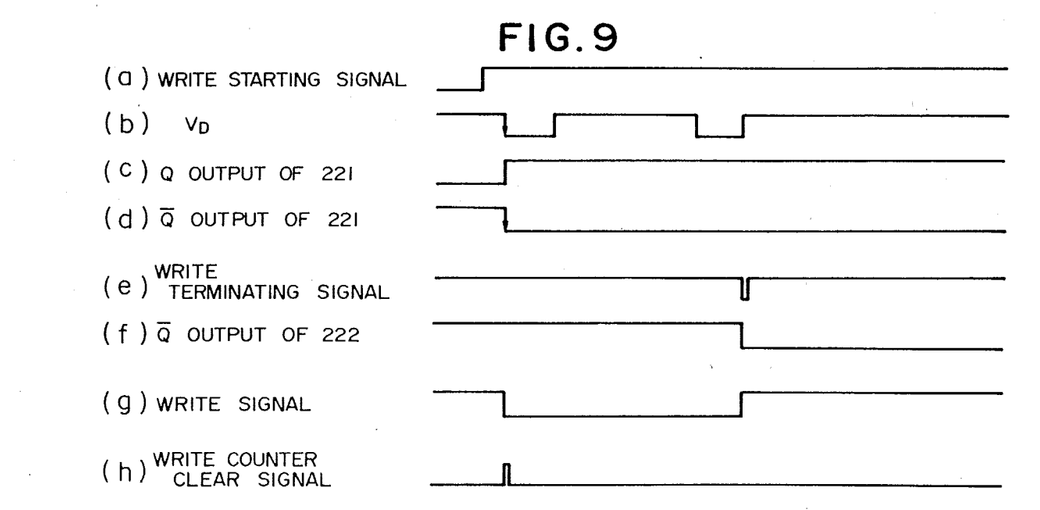
FIG. 9 is another time chart of output signals in various sections.

In this circuit, a write starting signal supplied from the television camera $V_{CL}$ generating circuit 19 is changed from an "L" level to an "H" level; the J/K flip-flop 21 becomes enabled, and its output is inverted by a falling edge of a vertical synchronizing signal $V_D$ which is the first to come, as shown in FIG. 9, as a consequence of which its Q output is changed from an "L" level to an "H" level whereas its $\overline{Q}$ output is changed from an "H" level to an "L" level.

The $\overline{Q}$ output of flip-flop 221 is formed into a write counter clear signal through the one-shot timer 223 and is applied to the IC memory 15 so as to reset a memory address when written.

On the other hand, when Q output of flip-flop 221 becomes an "H" level, the J/K flip-flop 222 becomes enabled at this time, and its output is inverted by a write terminating signal and its $\overline{Q}$ output is changed from an "H" level to an "L" level.

Since the Q output terminal of the J/K flip-flop 221 and the $\overline{Q}$ output of the J/K flip-flop 222 are connected to the NAND gate NAND 5, the output of the NAND gate NAND 5 is changed from an "H" level to an "L" level by the falling of the signal $V_D$ and is changed from an "L" level to an "H" level by the write terminating signal so as to determine the write span.

Figure 10:
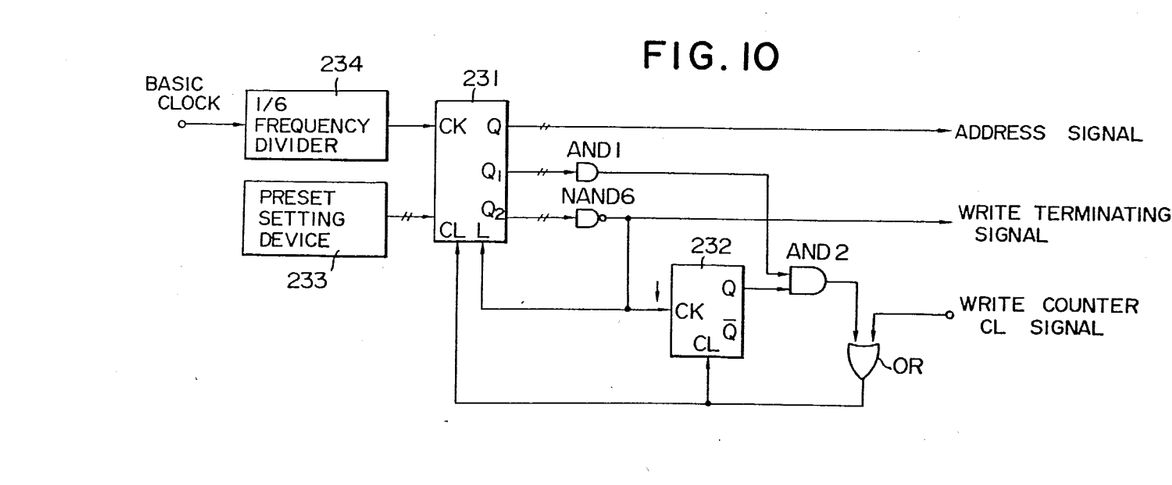
FIG. 10 is a block diagram of an address generating circuit.

Next, an address generating circuit 23 of an IC memory used to realize jump scanning by means of a video signal for one field portion, that is, a read control circuit for an IC memory will be described.

FIG. 10 shows the details thereof. A reference numeral 231 desginates a present counter (an address counter); element 232 is a J/K flip-flop; element 233 is a preset setting device; element 234 is a 1/6 frequency divider; NAND 6 is a NAND gate; AND 1 and AND 2 are AND gates and element OR is an OR gate.

This circuit is reset by a write counter clear signal CL (which is the same as the vertical synchronizing signal at the time of timing) which is outputted from the write timing circuit 22, the address signal becoming a 0 value and at the same time, the writing into the memory starts.

Figure 11:
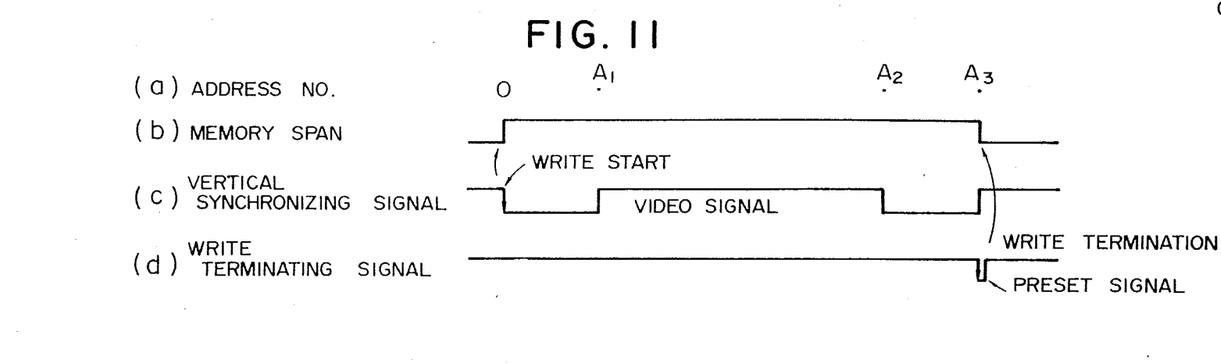
FIG. 11 is still another time chart of output signals in various sections.
Figure 12:
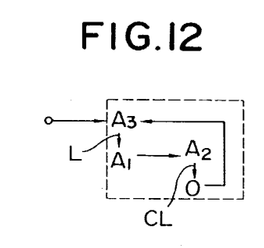
FIG. 12 is a flowchart of a read cycle.

The counter 231 starts counting the output from the divider 234, wherein a basic clock signal is subjected to frequency division to change an address. When the counter address output assumes a BCD output corresponding to $A_3$ as shown in FIG. 11, the output of the NAND gate NAND 6 is changed from an "H" level to an "L" level so as to generate a write terminating signal whereby a write to read cycle is provided as shown in FIG. 12 and at the same time, a counter load signal is generated to set the counter 231 to an address $A_1$ set by the preset setting device 233. The presetting device 233 has a plurality of digital outputs which are connected to the corresponding inputs of counter 231. The counter load signal causes the counter 231 to store the output of the presetting device which corresponds to the width of the vertical synchronous signal of the first field. It is noted that a group of switches may be used to form the presetting device 233.

The counting operation then progresses until the counter address output becomes a BCD output corresponding to $A_2$, and the output of the AND gate AND 1 is then changed from an "L" level to an "H" level, which passes through the AND gate 2 and the OR gate OR so as to reset the counter 231. The address is then returned to 0. At the same time, the J/K flip-flop 232 is reset so as to change its Q output from an "H" level to an "L" level.

Then, the counting operation is again effected, and the counter address output first becomes an $A_2$ value but at this time, the Q output of the J/K flip-flop 231 is an "L" level and therefore, the output of the AND gate AND 2 remains unchanged and the counter 231 keeps counting.

When the count reaches a value of $A_3$, the output of the NAND gate NAND 6 is changed from an "H" level to an "L" level and the like in the former case, and the counter 231 is loaded with the preset value $A_1$.

At the same time, the J/K flip-flop 232 is toggled and its Q output is changed from an "L" level to an "H" level.

When the count reaches a value of $A_2$, the $Q_2$ output of the J/K flip-flop 231 becomes an "H" level and therefore, the counter 231 is reset.

Afterwards, a similar operation is effected to keep performing the read-operation.

As described above, the present invention has a characteristic in that a circuit used for reading a signal to realize jump scanning by a video signal for one field from the IC memory 15 can be effected by an extremely simple circuit.

1. A monitoring apparatus for color printing, comprising:

a stroboscope for illuminating printed matter moving at a high speed with extremely short pulse-like strobe light;

a color television camera for receiving an image formed by light reflected from or transmitted through said printed matter, said light being from said stroboscope;

an A/D conversion circuit connected to said camera for converting a composite video signal from said camera resulting from a lag of a projected image formed on a camera tube of said color television camera, said composite video signal including a vertical synchronizing signal and a video signal;

a serial to parallel conversion circuit connected to said A/D conversion circuit for converting a serial digital output signal from said A/D conversion circuit into a parallel digital signal;

an IC memory connected to said serial to parallel conversion circuit for storing signals of both a first field portion and a second field portion of said composite video signal;

an address control circuit connected to said IC memory for causing said IC memory to repeatedly output video signals for said field portions stored in said IC memory in an order of: one—a vertical synchronizing signal of said first field, two—a video signal of said first field, three—a vertical synchronizing signal of said second field, and four—a video signal of said first field, and a color television monitor connected to an output of a D/A conversion circuit which is connected to an output of a parallel to serial conversion circuit which is connected to an output of said IC memory for displaying a signal output from said IC memory by said address control circuit as a stationary image of said printed matter, said signal output being transmitted through said parallel to serial conversion circuit and said D/A conversion circuit.

* * * * *